UNITED STATES PATENT OFFICE.

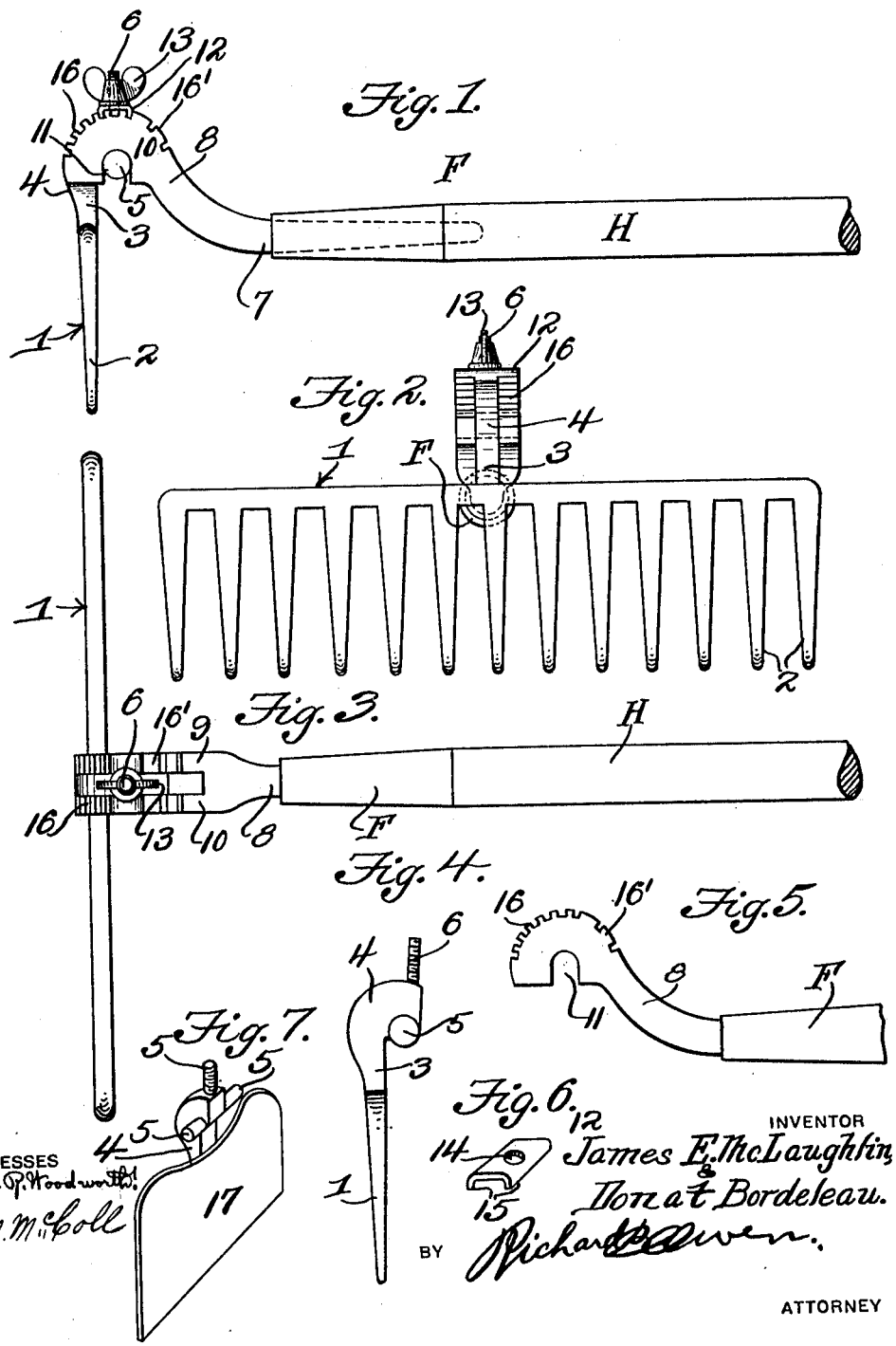

JAMES ED. McLAUGHLIN AND DONAT BORDELEAU, OF GRANDMERE, QUEBEC, CANADA.

AGRICULTURAL IMPLEMENT.

1,270,852.   Specification of Letters Patent.   Patented July 2, 1918.

Application filed June 28, 1917. Serial No. 177,540.

*To all whom it may concern:*

Be it known that we, JAMES E. McLAUGHLIN and DONAT BORDELEAU, subjects of the King of Great Britain, residing at Grandmere, in the Province of Quebec and Dominion of Canada, have invented certain new and useful Improvements in Agricultural Implements, of which the following is a specification.

This invention relates to agricultural implements, and more particularly to those having interchangeable blades or tools.

The primary object of the invention is to so construct an implement of this character that the blade or tool thereof may be readily adjusted at various angles to adapt it to perform different functions and which is interchangeable with other blades to adapt it for different uses.

Another object is to so construct an implement of this character that the blade thereof may be set at any desired angle to adapt it for use by a short or a tall person and which, by changing the adjustment will adapt it to be used for different purposes.

Still another object is to construct a device of this character which is simple in construction, cheap to manufacture, and in which the blades may be quickly changed.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of an implement constructed in accordance with this invention, a rake head being shown in this form of the invention, Fig. 2 is a front elevation thereof, Fig. 3 is a top plan view, Fig. 4 is an end view of the rake head detached, Fig. 5 is a detail of the shank, a portion of the handle being shown connected thereto, Fig. 6 is a detail perspective view of the clamping member, and Fig. 7 is a detail perspective view of a hoe blade designed to be changed with the rake head shown in the other figures.

In the embodiment illustrated in Figs. 1 to 4, the tool employed is in the form of a rake head 1 having the usual teeth 2 and a tang 3. This tang 3 rises vertically from the rake head midway the ends thereof and has a quadrant shaped arm 4 provided at its free end with laterally extending journals as 5 designed for a purpose presently to be described. These journals 5 are shown arranged at the lower or inner edge of the quadrant shaped arm, and a threaded stud 6 extends upwardly from said arm at a point opposite the journals as is shown clearly in Fig. 4 and which is designed for a purpose presently to be described.

A handle H of ordinary construction is here shown provided with a ferrule F in which is inserted one end of a shank 7 as is shown clearly in Fig. 1. This shank 7 has an offset head 8 provided with a pair of laterally spaced semi-circular arms 9 and 10, the straight inner edges of which have bearings in the form of notches 11, the bearing in one arm registering with that in the other and which are designed to receive the journals 5 of the tool head, the quadrant shaped arm 4 of which is designed to be positioned between the arms 9 and 10 of the shank and the threaded stud 6 of which projects beyond the curved edges of the arms 9 and 10 and is designed to receive a clamping element 12 which is held in position by a wing nut 13 screwed on said stud 6.

The curved edges of arms 9 and 10 are provided with a plurality of transversely extending peripherally spaced ribs 16, those on one arm registering with those on the other and these ribs are shown of uniform width throughout the greater portion of the series, but those at the rear thereof are double the width of the others as shown at 16' in Fig. 1.

The clamping element 12 is constructed of a metal plate having an aperture 14 for the passage therethrough of the stud 6 and at its opposite edges has laterally extending flanges 15 spaced apart a distance sufficient to span two of the ribs 16 of the arms 9 and 10 as is shown clearly in Fig. 1, so that when this plate is so engaged and the wing nut 13 screwed home, the tool will be rigidly and securely locked to the shank. It will thus be seen that to adjust the angle of this tool, all that is necessary is to loosen the nut 13, disengage the clamp 12 from the ribs of the shank arms and turn the tang of the tool to position the tool at any desired angle and then tighten up the nut, having first placed the flanges of the clamp in engagement with the spaces between the ribs.

As shown, the clamping plate 12 is of a length corresponding to the distance between the outside edges of the two arms 9 and 10 of shank 7 and is shown clearly in Fig. 3, although obviously it need not be exactly of such a length.

In Fig. 7, a hoe blade 17 is shown of usual construction and from the upper edge of which rises a tang 4 constructed exactly the same as the tang of the other figures. It will thus be seen that the rake head 1 may be removed and the hoe blade 17 substituted therefor and that any other shaped tool may be equipped with this peculiarly constructed tang and used in connection with the shank herein shown and described and which constitutes one feature of this invention.

While the shank 7 is shown mounted in a ferrule F, it is to be understood that it need not necessarily be so constructed but may be driven into the handle or made an integral part thereof.

From the above description it will thus be obvious that the rake head shown in Figs. 1 to 4 may be set at any desired angle to prevent the tendency of the teeth to stick in the sod and also to adapt the device for use by persons of different heights and the hoe blade shown in Fig. 7 may be so positioned as to adapt it to be used for a hoe, a shovel, a spade, a scraper, as may be desired.

It will thus be understood that while a hoe blade and a rake head are herein shown and described, any other tools may be equipped with the tang of this invention, and said tool adjustably connected with the shank in the manner above set forth.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. In an implement of the class described, a handle, a shank carried thereby and having a pair of semi-circular laterally spaced arms with registering notches in their straight edges, a tool having a tang disposed between said arms and provided with journals for pivotal engagement with said notches, and means for locking said tang to said arms to hold the tool in adjusted position.

2. In an implement of the class described, a handle, a shank carried thereby and provided at its free end with a pair of semi-circular laterally spaced arms having registering notches in their straight inner edges and transversely extending ribs on their curved edges, a tool having a tang disposed between said arms and connected for pivotal movement in relation thereto, a threaded stud projecting from said tang beyond the ribbed edges of said shank arms, a clamping member carried by said stud and having means for interlocking engagement with said ribs, and a nut mounted on said stud for securing the clamp in engaged position relative to said shank arms.

3. In an implement of the class described, a handle, a shank carried thereby and having a pair of semi-circular laterally spaced arms at its free end, bearings formed in the straight edges of said arms, transversely extending ribs arranged on the curved edges thereof, the ribs on one arm registering with those on the other, a tool having a tang provided with a quadrant shaped arm adapted to be positioned between the arms of the shank and having laterally extending journals at its free end on its lower edge for pivotal engagement with the bearings in said shank arms, a threaded stud extending from the free end of the curved edge of said quadrant shaped arm and projecting beyond the ribbed edges of the shank arms, a clamp mounted on said stud and having flanges for insertion between said ribs, and a wing nut disposed on said stud outside said clamp for locking the clamp in adjusted position whereby the tool may be held at any desired angle.

4. In an implement of the class described, a handle, a shank carried thereby and having a semi-circular arm projecting longitudinally from the free end thereof, said arm having a bearing in its straight edge and ribs extending transversely of its curved edge, a tool having a tang provided with a journal for engagement with the bearing of said shank arm, and means carried by said tang for engaging the ribs of said shank arm to adjustably secure said tool in relation to said shank.

5. A device of the class described comprising a handle having a tool carrying shank, bifurcated at its free end, the furcations of which are semi-circular in form with peripherally spaced notches in their curved edges and registering bearings in their straight edges, a tool having a tang for insertion between said furcations and provided with laterally extending journals adapted to be rotatably engaged with the bearings of said shank, and means carried by said tang for detachably engaging the notches in said furcations whereby the tool may be adjusted and held at different angles in relation to the shank.

In testimony whereof we affix our signatures in presence of two witnesses.

JAMES ED. McLAUGHLIN.
DONAT BORDELEAU.

Witnesses:
JOSEPH DESCHAMPS,
ADELOR BORDELEAU.